United States Patent
Schreiner et al.

(10) Patent No.: US 10,829,374 B2
(45) Date of Patent: Nov. 10, 2020

(54) METHOD FOR PARTIAL REDUCTION OF SO2

(71) Applicant: Messer Industries USA, Inc., Bridgewater, NJ (US)

(72) Inventors: Bernhard Schreiner, Oberhaching (DE); Hanno Tautz, Geretsried (DE); Xiaoping Tian, Pinchbeck (GB)

(73) Assignee: Messer Industries USA, Inc., Wilmington, DE (US)

(*) Notice: Subject to any disclaimer, the term of this patent is extended or adjusted under 35 U.S.C. 154(b) by 0 days.

(21) Appl. No.: 16/489,811

(22) PCT Filed: Mar. 8, 2018

(86) PCT No.: PCT/EP2018/055852
§ 371 (c)(1),
(2) Date: Aug. 29, 2019

(87) PCT Pub. No.: WO2018/162692
PCT Pub. Date: Sep. 13, 2018

(65) Prior Publication Data
US 2020/0062593 A1 Feb. 27, 2020

(30) Foreign Application Priority Data
Mar. 9, 2017 (EP) .................... 17020092

(51) Int. Cl.
*C01B 17/04* (2006.01)
*F23D 14/22* (2006.01)

(52) U.S. Cl.
CPC .......... *C01B 17/0478* (2013.01); *F23D 14/22* (2013.01)

(58) Field of Classification Search
CPC . C01B 17/04; C01B 17/0478; F23C 2201/00; F23C 2201/30; F23D 14/20; F23D 14/22
See application file for complete search history.

(56) References Cited

U.S. PATENT DOCUMENTS 3,963,443 A * 6/1976 Bond .................. C01B 17/0417
422/618
6,352,680 B1 3/2002 Watson et al.
(Continued)

FOREIGN PATENT DOCUMENTS

GB 2 467 930 A 8/2010

OTHER PUBLICATIONS

International Search Report for PCT/EP2018/055852, dated Jun. 28, 2018, Authorized Officer: Costin Gavriliu, 3 pgs.
(Continued)

*Primary Examiner* — Timothy C Vanoy
(74) *Attorney, Agent, or Firm* — Joshua L. Cohen

(57) ABSTRACT

The present invention relates to a method for partial reduction of $SO_2$, wherein a $SO_2$ stream, an oxidant and a gaseous fuel are fed to a burner and reacted in a flame reaction. The burner comprises at least one supply opening for the $SO_2$ stream, at least one supply opening for the oxidant and at least one supply opening for the gaseous fuel, and a burner head (1) with first injection sets (7, 8) and second injection sets (9). First injection sets (7, 8) are arranged in a first section (4) of the burner head (1), and second injection sets (9) are arranged in a second section (5) of the burner head (1). The stoichiometric ratio of $SO_2$, fuel and oxidant supplied through the first injection sets (7, 8) is different from the stoichiometric ratio of $SO_2$, fuel and oxidant supplied through the second injection sets (9).

15 Claims, 1 Drawing Sheet

(56) References Cited

U.S. PATENT DOCUMENTS

2003/0108839 A1    6/2003   Watson et al.
2003/0133850 A1    7/2003   Watson et al.

OTHER PUBLICATIONS

Written Opinion of ISA for PCT/EP2018/055852, dated Jun. 28, 2018, Authorized Officer: Costin Gavriliu, 5 pgs.

* cited by examiner

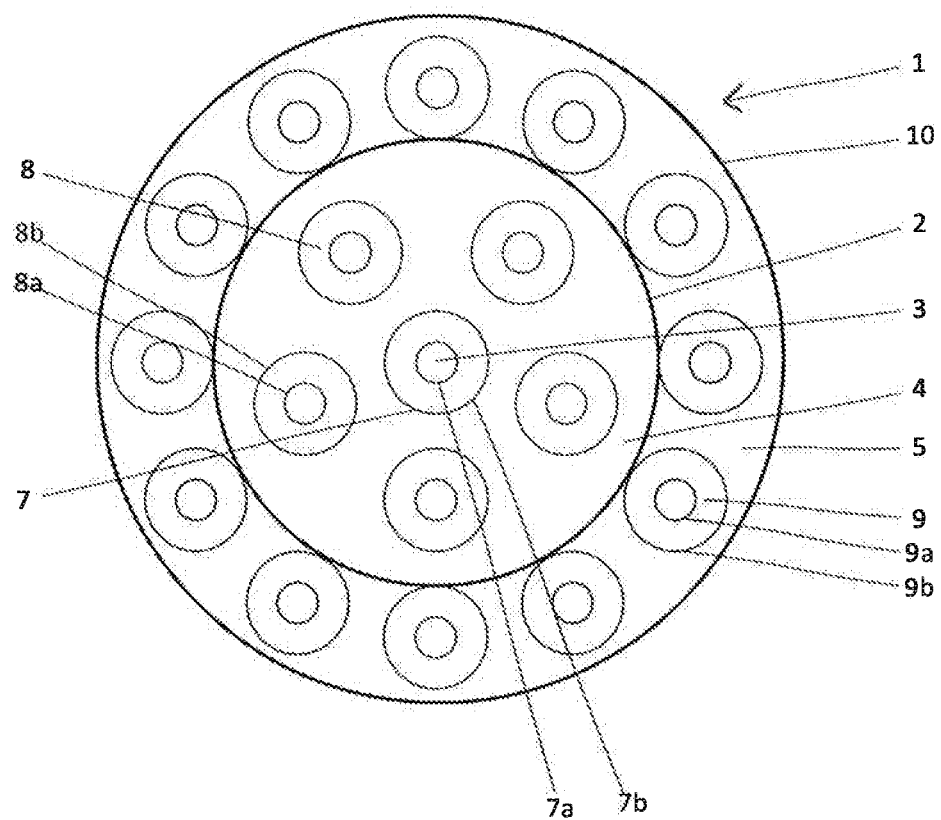

METHOD FOR PARTIAL REDUCTION OF SO2

TECHNICAL FIELD OF THE PRESENT INVENTION

The present invention relates to a method for partial reduction of $SO_2$, wherein a $SO_2$ stream, an oxidant and a gaseous fuel are fed to a burner and reacted in a flame reaction, wherein the burner comprises at least one supply opening for the $SO_2$ stream, at least one supply opening for the oxidant and at least one supply opening for the gaseous fuel, and wherein the burner comprises a burner head with first injection sets and second injection sets.

TECHNOLOGICAL BACKGROUND OF THE PRESENT INVENTION

Sulphur recovery normally is based on partial oxidation of $H_2S$, mainly realised by the Claus process. However, sulphur recovery is also possible by partial reduction of $SO_2$. In cases where highly concentrated $SO_2$ feed is to be treated one solution is to combine a thermal process step with a subsequent catalytic reaction in order to obtain elemental sulphur as a liquid.

In the thermal step the reactants are reacted in a free flame. In order to allow for the necessary free flame reaction which is the core part of the thermal section, a burner has to be applied.

Such a burner has to be robust and reliable under the operation conditions. It has been found difficult with conventional burners to achieve a stable flame in the thermal step during pilot tests. This is due to the large amount of $SO_2$ inerts in the combustion process. The burner also has to ensure efficient mixing of the different feed streams which have to be brought in thorough contact for fast and complete reaction.

Another challenge in burner design is to scale up the process from pilot unit to industrial scale.

Disclosure of the Present Invention: Object, Solution, Advantages

Starting from the disadvantages and shortcomings as described above as well as taking the prior art as discussed into account, an object of the present invention is to provide a method for partial reduction of $SO_2$ which avoids one or more of the above-mentioned problems; in particular, it is an object of the present invention to provide a method which allows establishing a stable flame when $SO_2$ is reacted with a fuel and an oxidant.

One of more of these objects are achieved by a method for partial reduction of $SO_2$, wherein a $SO_2$ stream, an oxidant and a gaseous fuel are fed to a burner and reacted in a flame reaction, wherein the burner comprises at least one supply opening for the $SO_2$ stream, at least one supply opening for the oxidant and at least one supply for the gaseous fuel, and wherein the burner comprises a burner head with first injection sets and second injection sets.

The present invention is characterized in that the first injection sets are arranged in a first section of the burner head and that the second injection sets are arranged in a second section of the burner head and that the stoichiometric ratio of $SO_2$, fuel and oxidant supplied through the first injection sets is different from the stoichiometric ratio of $SO_2$, fuel and oxidant supplied through the second injection sets.

The present invention proposes the use of a burner with at least three different supply openings for the fuel, for the oxidant and for the $SO_2$. With the reactant introduction by different channels the gas velocity requirements can be better adopted to the differences of reductive operation and stand by operation. It has the flexibility of diverting various gas streams into the burner supply openings to suit different operation modes' requirement.

The burner head comprises first and second injection sets. According to the present invention the fuel, oxidant and $SO_2$ leaving the first injection sets have a different stoichiometry than the fuel, oxidant and $SO_2$ leaving the second injection sets. The relative quantities of the reactants in the combustion reaction in the flames at the first injection sets differ from the relative quantities of the reactants in the combustion reaction in the flames at the second injection sets. Thus, the respective combustion reaction will be different.

In a preferred embodiment the composition of fuel, oxidant and $SO_2$ supplied through the first section is at a higher stoichiometric level that the composition supplied through the second section. That means in the first section the oxidant flow relative to the fuel and $SO_2$ flow is higher than in the second section.

The term "injection set" shall mean a unit comprising one or more outlets for one or more reactants. An injection set can be a simple pipe for one reactant or for a mixture of reactants. An injection set can also be an arrangement of two or more passage means, for example pipes, close to each other but with separate respective outlets in order to supply two or more reactants separately and have them reacted after they have left the injection set.

It has been found that the reaction for partial reduction of $SO_2$ with fuel and oxidant at the thermal stage then lead to the Claus reaction requires a certain composition of each reactant. However, these relative quantities of reactants are outside the flammability regime overall. That means, combustion of such a mixture of $SO_2$, fuel and oxidant will not burn or combust or at least it will lead to an instable flame.

Therefore, the present invention is to suggest splitting the reactants into two different composition fields. This allows adjusting one field within the flammability limits such that a stable flame is achieved. The second combustion field as such is outside the flammability range but it will be combusted with the stable flame from the reaction of the first combustion field. The overall reaction will thus be stable.

Mixtures of reactants, such as fuel, oxidant and an inert gas, will combust only if the concentration of the reactants lies within well-defined lower and upper bounds, referred to as flammability limits. These flammability limits define a flammability range or flammability regime. This flammability regime can be depicted in flammability diagrams which can be found in standard technical literature.

The flammability regime can be shown in an orthogonal diagram, showing only two substances, implicitly using that the sum of all three components are 100 percent. For example, for the combustion of methane, oxygen and $SO_2$ such a diagram could display the methane concentration on the x-axis and the oxygen concentration on the y-axis. The $SO_2$ concentration is then automatically given as the remaining concentration to add up to 100 percent.

As an example, at a temperature of 192° C. and at a pressure of 1.0 bar for the combustion of methane, oxygen and $SO_2$ the flammability regime in such a diagram would be given as a triangle (flammability triangle) which is defined by the pairs of values
(3.7 vol-% $CH_4$; 96.3 vol-% $O_2$)
(66.4 vol-% $CH_4$; 33.6 vol-% $O_2$)

(5.3 vol-% $CH_4$; 9.5 vol-% $O_2$) the remainder being $SO_2$. Any composition of $CH_4$, $O_2$ and $SO_2$ which is within the triangle defined by these pairs of values will give a stable combustion.

With increasing size single-flame burners are getting worse in respect of adequate mixing of the reactants. Therefore, the present invention suggests using a multi-flame burner with first and second injection sets. Such a multi-flame burner can ensure thorough mixing at different gas flows. Each single flame shows good mixing properties. The single flames are so close to each other that by combining a number of neighbouring flames a large comprehensive flame region is achieved.

For the application of $SO_2$ reduction a hydro carbon stream is partially oxidized with an oxidant. Preferably, under normal operation conditions oxygen enriched air or pure oxygen are used as oxidant. Preferably, the oxidant has an oxygen content of at least 90 percent by volume. During start-up and hot stand-by operation air is used as oxidant.

In one embodiment of the present invention one or more first and/or second injection sets comprise a first port for the oxidant and a second port for fuel and/or $SO_2$. By using such an injection set the oxidant is provided separately from the fuel and or the $SO_2$. The injection set may comprise one first port for the oxidant and one second port. Fuel, $SO_2$ or a mixture of fuel and $SO_2$ is passed to the second port.

As mentioned above, the total amounts of reactants might be outside the flammability regime. The combustion of such a mixture of reactants will not burn or combust or at least it will not lead to a stable flame.

Thus, according to another embodiment of the invention the relative quantities of $SO_2$, fuel and oxidant flowing through the first injection sets are within the flammability regime and the relative quantities of $SO_2$, fuel and oxidant flowing through the second injection sets are outside the flammability regime. Thereby a staged combustion is achieved.

In a preferred embodiment the first section and the second section do not overlap. Thereby, the reactant composition in front of the first injection sets will generate a much hotter central flame zone, while the composition of reactants in front of the second injection sets will generate a slightly cooler zone around. This is suited for the flame profile required inside the reaction furnace to avoid flame impingement and hot spots forming onto the reaction furnace wall.

Preferably, the first section and the second section are arranged such that the second injection sets are more distant from the center of the burner head than any of the first injection sets. The inner portion of the burner head cross section defines the first section and the outer portion of the burner head cross section defines the second section.

In a preferred embodiment the inner portion, and thus the first section, is a circular area with its center being the center of the burner head. Provided that the cross section of the burner head is circular, the outer portion or second section is a ring-shaped region encircling the first section.

The present invention is in particular useful for partial reduction of $SO_2$ wherein the total quantities of fuel, $SO_2$ and oxidant supplied to the burner are outside the flammability regime.

Preferably, during normal operation of the inventive method the oxidant has an oxygen content of at least 90 percent by volume. In another embodiment pure oxygen with an oxygen content of more than 99 percent by volume is used as oxidant. "Normal operation" shall mean that the process parameters are set such that an optimum or maximum amount of sulphur is produced by the inventive partial reduction method.

The burner head is preferably designed as a multi-flame burner head with between three and ten first injection sets and/or between five and twenty second injection sets. Such a multi-flame burner head ensures a thorough mixing of the reactants with increasing feed flows. This is achieved by adding up a number of neighbouring flames from neighbouring injection sets resulting in a large flame region with suitable profile.

The injection sets are preferably arranged close to each other so that the respective flames are near to each other. The distance between two injection sets is for example less than 100 mm, less than 80 mm, less than 60 mm or less than 40 mm.

For example, if the injection sets are designed as pipe-in-pipe arrangements with an inner and an outer pipe, the distance between two injection sets can be between 50 percent and 150 percent of the diameter of the inner pipe or between 20 percent and 100 percent of the diameter of the outer pipe.

In a preferred design one or more of the first and/or one or more of the second injection sets comprise an inner pipe and a coaxial outer pipe and the outlet of the inner pipe defines the first port and the ring-shaped outlet between the inner pipe and the outer pipe defines the second port.

The first and the second section can be separated by a structural element or only by an imaginary line. In the first alternative the burner could for example comprise a central pipe and the first section is defined by the cross section of the central pipe.

In another embodiment the burner comprises an additional pipe coaxially arranged with the central pipe and the second section is defined by the cross section of the annulus between the additional pipe and the central pipe. Within that annulus or ring-shaped region the second injection sets are arranged. In another embodiment fuel and/or $SO_2$ are passed through that annulus between the second injection sets.

According to an embodiment of the present invention the fuel comprises at least 80 percent by vol $CH_4$. Preferably natural gas is used as fuel.

The inventive method is in particular useful when at least 100 tons/day sulphur, at least 200 tons/day sulphur or even over 1000 tons/day sulphur are produced by partial reduction of $SO_2$.

BRIEF DESCRIPTION OF THE DRAWING

For a more complete understanding of the present inventive embodiment disclosures and as already discussed above, there are several options to embody as well as to improve the teaching for the present invention in an advantageous manner. To this aim, reference may be made to the claims dependent on claim 1; further improvements, features and advantages of the present invention are explained below in more detail with reference to the following description of a preferred embodiment by way of non-limiting example and to the appended drawing FIGURE taken in conjunction with the description of the embodiment, of which:

FIG. 1 shows the layout of a burner head for use in the invention.

DETAILED DESCRIPTION OF THE DRAWINGS; BEST WAY OF EMBODYING THE PRESENT INVENTION

Before explaining the present inventive embodiment in detail, it is to be understood that the embodiment is not limited in its application to details of construction and arrangement of parts illustrated in the accompanying drawing, since the present invention is capable of other embodiments and of being placed or carried out in various ways. Also, it is to be understood that the phraseology or terminology employed herein is for the purpose of description and not of limitation.

In the following description, terms such a horizontal, upright, vertical, above, below, beneath and the like, are used solely for the purpose of clarity illustrating the present invention and should not be taken as words of limitation. The drawings are for the purpose of illustrating the present invention and are not intended to be to scale.

The burner head 1 shown in FIG. 1 is used for partial reduction of $SO_2$ by combusting $SO_2$ with natural gas as fuel and oxygen. $SO_2$, natural gas and $O_2$ are supplied as separate feed streams to the burner (not shown). The separate feeds allow to adjust the respective gas velocities in order to optimize the reaction conditions at different flow rates or when the process is switched from normal operation to stand-by or vice versa.

The burner head 1 comprises a first section 4 of circular shape circular arranged coaxial with the burner axis 3. The circumference 2 of the first section 4 divides the cross-sectional area of the burner head 1 into the first section 4 and a second section 5. The first section 4 is of circular shape and the second section 5 is ring-shaped.

Within the first section 4 there are six first injection sets 7, 8. Each first injection set 7, 8 consists of an inner pipe 7a, 8a and an outer pipe 7b, 8b coaxial with the inner pipe 7a, 8a. One first injection set 7 is centrally arranged in the burner head 1. The other five first injection sets 8 are equally distributed on a circle around first injection set 7.

Within the second section 5 there are arranged twelve second injection sets 9. The second injection sets 9 are equally distributed on a circle around the center 3 of the burner head 1. Each second injection set 9 consists of an inner pipe 9a and an outer pipe 9b coaxial with the inner pipe 9a.

Oxygen is passed through the inner pipes 7a, 8a, 9a of the first and second injection sets 7, 8, 9. However, the flowrate of oxygen passed through the inner pipes 7a, 8a is different from the oxygen flowrate through the inner pipes 9a of the second injection sets 9 as will be explained below.

A mixture of $SO_2$ and $CH_4$ is passed through the outer pipes 7b, 8b, 9b of the first and second injection sets 7, 8, 9. The flowrate of the $SO_2$—$CH_4$-mixture passed through the outer pipes 7b, 8b is different from the $SO_2$—$CH_4$-mixture flowrate through the outer pipes 9b.

Further, a mixture of reactants could also be sent through the annular space inside the shell 10 of the burner head 1. The fuel mixture flows through the intermediate space between the first and second injections sets 7, 8, 9.

Burner 1 is used in a thermal stage of a sulphur recovery unit for partial reduction of $SO_2$. $SO_2$, natural gas and technical pure oxygen are supplied to the burner. The overall composition of the reactants falls outside of the flammability region. Thus, the combustion of such a composition of the reactants will not be stable.

According to the invention the (inner) first section 4 and the (outer) second section 5 are provided with the reactants in different compositions. The stoichiometric ratio of $SO_2$, natural gas ($CH_4$) and $O_2$ supplied through the first injection sets 7, 8 is different from the stoichiometric ratio of $SO_2$, natural gas and oxygen supplied through the second section 5.

The mixture in section 4—the inner circle—could lead to a stable combustion and generate high flame temperature required. This instantaneous reaction will also result in starting the reaction at the outer circle section 5. The temperature in section 5 will be much lower than the flame centre in section 4. Therefore, this could provide protection to the reaction furnace wall from the very hot central flame. This means a flame temperature profile well suited for such application.

The inner and outer circle stoichiometric levels can be adjusted according to the specific requirement for each design. This can be achieved through using different numbers of injectors and different size of injectors, as well as different layout of the injectors.

LIST OF REFERENCE SIGNS 1 burner head
2 circumference of first section 4
3 burner axis or centre of burner head 1
4 first section of burner head 1
5 second section of burner head
7, 8 first injection set
7a, 8a first port or inner pipe of first injection set 7, 8
7b, 8b second port or outer pipe of first injection set 7, 8
9 second injection set
9a first port or inner pipe of second injection set 9
9b second port or outer pipe of second injection set 9
10 shell of burner head 1

The invention claimed is:

1. A method for partial reduction of $SO_2$, wherein a $SO_2$ stream, an oxidant and a gaseous fuel are fed to a burner and reacted in a flame reaction, wherein the burner comprises at least one supply opening for the $SO_2$ stream, at least one supply opening for the oxidant and at least one supply opening for the gaseous fuel, and wherein the burner further comprises: a burner head (1) with first injection sets (7, 8) and second injection sets (9), the first injection sets (7, 8) arranged in a first section (4) of the burner head (1), the second injection sets (9) arranged in a second section (5) of the burner head (1), and a stoichiometric ratio of $SO_2$, fuel and oxidant supplied through the first injection sets (7, 8) is different from a stoichiometric ratio of $SO_2$, fuel and oxidant supplied through the second injection sets (9).

2. The method of claim 1, wherein at least one of the first and/or second injection sets (7, 8, 9) comprise a first port (7a, 8a, 9a) for oxidant, and a second port (7b, 8b, 9b) for fuel and/or $SO_2$.

3. The method of claim 1, wherein the relative quantities of $SO_2$, fuel and oxidant flowing through the first injection sets (7, 8) are within the flammability regime, and the relative quantities of $SO_2$, fuel and oxidant flowing through the second injection sets (9) are outside the flammability regime.

4. The method of claim 1, wherein the first section (4) and the second section (5) do not overlap.

5. The method of claim 4 wherein the second injection sets (9) are more distant from the centre (3) of the burner head (1) than any of the first injection sets (7, 8).

6. The method of the claim 1, wherein the total quantities of fuel, $SO_2$ and oxidant supplied to the burner are outside the flammability regime.

7. The method of claim 1, wherein the oxidant has an oxygen content of at least 90 percent by volume during normal operation.

8. The method of claim 1, wherein air is used as oxidant during stand by operation.

9. The method of claim 1, wherein the fuel comprises at least 80 percent by volume $CH_4$.

10. The method of claim 1, wherein the burner head (1) comprises between three and ten first injection sets (7, 8), and/or between five and twenty second injection sets (9).

11. The method of claim 1, wherein one or more of the first injection sets (7, 8) and/or one or more of the second injection sets (9) comprise an inner pipe and a coaxial outer pipe, and an outlet of the inner pipe defines a first port (7a, 8a, 9a), and a ring-shaped outlet between the inner pipe and the coaxial outer pipe defines a second port (7b, 8b, 9b).

12. The method of claim 1, wherein the burner comprises a central area, and the first section (4) is defined by a cross section of the central area.

13. The method of claim 1, further comprising passing the fuel and/or $SO_2$ through a space between the first injection sets (7, 8) and the second injection sets (9).

14. The method of claim 1, wherein the partial reduction of $SO_2$ produces from at least 100 tons/day sulphur to at least 1000 tons/day sulphur.

15. The method of claim 1, wherein the ratio of $SO_2$, fuel and oxidant supplied through the first injection sets (7, 8) is at a higher stoichiometric level than the ratio of $SO_2$, fuel and oxidant supplied through the second injection sets (9).

\* \* \* \* \*